US011609620B2

(12) United States Patent
DeGraaf et al.

(10) Patent No.: US 11,609,620 B2
(45) Date of Patent: *Mar. 21, 2023

(54) APPARATUS, SYSTEM AND METHOD OF PROVIDING POWER IN AN OFFICE ENVIRONMENT

(71) Applicant: JABIL INC., St. Petersburg, FL (US)

(72) Inventors: Gerald DeGraaf, St. Petersburg, FL (US); Stephen A. McSoley, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,601

(22) Filed: Aug. 19, 2021

(65) Prior Publication Data

US 2021/0384732 A1     Dec. 9, 2021

Related U.S. Application Data (63) Continuation of application No. 15/464,176, filed on Mar. 20, 2017, now Pat. No. 11,121,555.

(51) Int. Cl.
| | | |
|---|---|---|
| *H02J 3/38* | (2006.01) | |
| *H02J 4/00* | (2006.01) | |
| *H05K 5/00* | (2006.01) | |
| *G06F 1/26* | (2006.01) | |
| *H02S 40/32* | (2014.01) | |
| *H02S 40/34* | (2014.01) | |
| *H02S 40/38* | (2014.01) | |
| *H02J 7/34* | (2006.01) | |

(Continued)

(52) U.S. Cl.
CPC .............. *G06F 1/26* (2013.01); *G06F 1/263* (2013.01); *H02J 3/38* (2013.01); *H02J 4/00* (2013.01);

(Continued)

(58) Field of Classification Search
CPC ...... H02J 3/382; H02J 3/38; H02J 4/00; H02J 7/34; H02J 3/383; H02J 7/02;
(Continued)

(56) References Cited

U.S. PATENT DOCUMENTS

| | | | |
|---|---|---|---|
| 8,061,864 B2 | 11/2011 | Metcalf et al. | |
| 2002/0000793 A1* | 1/2002 | Hanaki | H02J 7/00036 323/234 |

(Continued)

FOREIGN PATENT DOCUMENTS

| | | |
|---|---|---|
| KR | 101103502 B1 | 1/2012 |
| KR | 1020120005450 A | 1/2012 |

OTHER PUBLICATIONS

International Search Report for PCT/US2018/023236, dated Jul. 9, 2018.

(Continued)

*Primary Examiner* — Toan T Vu
(74) *Attorney, Agent, or Firm* — Thomas J. McWilliams; Barnes & Thornburg LLP (57) ABSTRACT

The disclosed apparatus, system and method may include at least the delivery of device power to a single or plurality of workstations, which may include at least one power storage unit suitable to supply power to the plurality of workstations; a plurality of control units each associated with one of the plurality of workstations, wherein each of the control units receives power from the at least one power unit, is communicatively associated with the at least one power unit, and comprises a plurality of power outputs suitable to output power from the power unit to devices associated with the respective workstation; and may include at least one ambient energy collector suitable to provide accumulated power to the at least one power unit.

20 Claims, 4 Drawing Sheets

(51) Int. Cl.
*H02J 50/00* (2016.01)
*H02J 7/02* (2016.01)

(52) U.S. Cl.
CPC .............. *H02J 7/34* (2013.01); *H02J 50/001* (2020.01); *H02S 40/32* (2014.12); *H02S 40/34* (2014.12); *H02S 40/38* (2014.12); *H05K 5/0017* (2013.01); *H02J 7/02* (2013.01)

(58) Field of Classification Search
CPC .......... H02J 50/001; G06F 1/26; G06F 1/263; H02S 40/32; H02S 40/34; H02S 40/38; H05K 5/0017; Y02E 10/56; Y02E 70/30
See application file for complete search history.

(56) References Cited

U.S. PATENT DOCUMENTS

| | | | | |
|---|---|---|---|---|
| 2015/0220044 A1* | 8/2015 | Tatsumoto | ................ | H02J 3/38 399/88 |
| 2015/0256031 A1* | 9/2015 | Raghavan | ......... | H02J 13/00022 307/24 |
| 2018/0325621 A1* | 11/2018 | Srimohanarajah | ..... | A61B 90/39 |

OTHER PUBLICATIONS

Written Opinion of the International Searching Authority for PCT/US2018/023236, dated Jul. 9, 2018.
International Preliminary Report on Patentability for PCT/US2018/023236, dated Jul. 9, 2018.

\* cited by examiner

APPARATUS, SYSTEM AND METHOD OF PROVIDING POWER IN AN OFFICE ENVIRONMENT

CROSS-REFERENCE TO RELATED APPLICATIONS

This application is a Continuation Application of U.S. patent application Ser. No. 15/464,176, filed Mar. 20, 2017, entitled: "Apparatus, System and Method of Providing Power in an Office Environment," which claims priority to International Application No. PCT/US2018/023236, filed Mar. 20, 2018, entitled: Apparatus, System and Method of Providing Power in an Office Environment," which are herein incorporated by reference in their entireties.

BACKGROUND

Field of the Disclosure

The present disclosure relates to electrical power, and, more specifically, to an apparatus, system and method of providing power in an office environment.

Description of the Background

Organizationally speaking, the set-up of an office environment has been historically consistent for many years, particularly since the advent of the computer. More particularly, the set-up of an office is centered around power drops at which power to office devices can be obtained, and the provision of "utility-provided" wall power or floor power. That is, table structures, desk dividers, chairs, and the like, if they are to receive power require a power input (at ceiling, wall or floor) and/or are to receive, in physical association therewith, physical elements such as computers or lamps that must receive power, must be proximate to a utility power supply, such as a wall socket, that supplies 120 volts (in the U.S. and 220 volts in Europe). It is for this reason that available office furniture setups, and particularly the organization of office tables and structures into an office "island", is limited in furniture design and placement. In short, in a typical office environment, for the foregoing reasons the office furniture must be proximate to power outlets, and mobile aspects of the office furniture, such as an office chair, typically does not receive power.

More particularly, in a typical office environment, a worker is provided with at least a desk and a chair. Further, it is frequent in current office embodiments that hoteling concepts are employed, wherein employees use non-exclusive office locations, i.e., the aforementioned desk and chair, and/or other office elements, are shared between several employees who use that office space at different times. These hoteling environments in particular, and most office environments in general, may thus, in addition to power requirements for computers and lights, require power for adjustable tables, chairs, and environmental conditions to improve the ergonomics of use by whoever is the current user.

Not only does the totality of the foregoing limit the ergonomic organization of office furniture and equipment, but additionally the organization of office elements around power outlets fails to make efficient use of available power within the office environment. More particularly, a typical office environment is not "green" in that constant power is drawn from the utility company's supplied power, whether or not that power is needed or is available from other sources. This ignores the fact that, in many office environments, ambient power, such as power provided from the sun, the ambient light and the heat of office lighting and office electronics, such as computer displays, could be put to use in a typical office environment to provide some power needs. Additionally, recharging could be allowed at non-peak times to lower utility costs or to simply reduce energy consumption during peak periods.

Historically and as referenced above, interlocking panels or the like have been employed in typical office furniture to allow for plugging in via wall, power drop, or floor to power devices physically associated with the office furniture. Thereby, facilities design is limited in how a room or office group may be arranged, which extends the time and coordination required to configure or reconfigure an environment. However, the foregoing manners of providing power cause the significant disadvantage of making inconvenient access to and around the desk space, at least because of the need to have permanent cords running to the points where power is needed. This inconvenient access is further exacerbated to the extent an island of multiple desks is created, at least because even more numerous cords are then necessary to provide power to each desk or chair of the island, and/or to all devices associated with each desk of the island.

Thus, the need exists for a power unit that can store power that is either received via temporarily plugging in during off hours or as needed, available via ambient sources, such as solar energy, kinetic energy sources, such as pedal or step modules, radio frequency (RF) harvesting and/or that is available via other methodologies atypical in an office environment. Moreover, there is a corresponding need to manage the accumulation and distribution of such power.

SUMMARY

The disclosed apparatus, system and method may include at least the delivery of device power to a plurality of workstations. The foregoing may include at least one power unit suitable to supply power to the plurality of workstations; a plurality of control units each associated with one of the plurality of workstations, wherein each of the control units receives power from the at least one power storage unit, is communicatively associated with the at least one power unit, and comprises a plurality of power outputs suitable to output power from the power unit to devices associated with the respective workstation; and at least one ambient energy collector suitable to provide accumulated power to the at least one power unit.

Thus, the disclosed embodiments provide an apparatus, system, and method for providing a power unit that can store power that is either received via temporarily plugging in during off peak hours, available via ambient sources, such as solar energy, kinetic energy sources, such as pedal or step modules, radio frequency (RF) harvesting and/or that is available via other methodologies atypical in an office environment.

BRIEF DESCRIPTION OF THE FIGURES

Referring now to the figures incorporated herein, shown are non-limiting embodiments of the present disclosure, wherein like numerals represent like elements, and wherein.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

The terminology used herein is for the purpose of describing particular exemplary embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Certain of the embodiments provide a power unit, such as may be used in an office environment, that can store power that is either received via temporarily plugging in during off hours, available via ambient sources, such as solar energy, kinetic energy sources, such as pedal or step modules, radio frequency (RF) harvesting and/or that is available via other methodologies atypical in an office environment. Moreover, certain of the embodiments satisfy a corresponding need to manage the accumulation and distribution of such power.

By way of non-limiting example, the power storage unit may be connected, such as via one or more network connective methodologies, to the internet of things (IoT), such as to provide notifications when power is low, and hence access to a new power storage unit or a recharge may be necessary, or when power is unused or excess power is available such that power may be "shared" with other linked power storage units. Thereby, "power grid" management capabilities may be provided in accordance with the embodiments, such as in order to divert underutilized, needed, or otherwise available power capacity to one or more locations where such capacity is needed.

Further, the aforementioned ambient energy collector(s) may be placed in association with the power unit(s) at any one or more locations to suitably receive, for example, heat energy, solar energy, light energy, kinetic energy or RF energy or the like. By way of non-limiting example, an ambient energy collecting panel may be placed upon a dividing panel between desks on an island, on an individual desk, on the back of a computer screen, on a chair (such as to collect kinetic energy), on the floor or the like.

In certain embodiments, a power storage unit and one or more corresponded controller units may be placed at one or more office work stations or islands, and/or in association with particular elements of a work station, such as a desk and a chair. The power storage device may store power received from a temporary power source or sources, such as a wall socket, auxiliary power storage unit and/or from various ambient or kinetic energy collectors which may be at one or several office locations, and may store this received power for eventual use. Consequently, the power device may include an accumulator of ambient power, such as an ambient solar input panel to receive solar energy, and storage capabilities that allow for the storage of energy in conjunction with the power storage device. The temporary power hook-up of the power storage device may allow for primary, emergency, or back-up power to be temporarily provided, such as by plugging the power storage unit into a wall or floor socket, such as using a plug wire, such as a retractable plug wire or other supplemental energy inputs.

The stored power may be provided, such as to different locations for different users and to serve different purposes, pursuant to instruction from a respective one or more of the controller box units. The control box unit may execute the providing of power, and/or may balance power based on needs, and/or may communicate the power status of each power storage unit, of each desk/chair office unit, and/or of each island, such as in parallel with other control boxes and such as to a central hub, or in series or in parallel with other control boxes, such as in an ad hoc network. Thereby, power accumulation, status, consumption and sharing may be tracked and regulated. Accordingly, control boxes may work together to supply power from one or more power storage units to any areas of need within the Office Island grid, to only areas of greatest need, or away from power units having sufficient or excess capacity.

Moreover and as mentioned, supplemented power may be added to the power storage device, such as to provide an upcharge or recharge of power for subsequent distribution via the one or more control boxes. This addition of supplemented power may be, by way of non-limiting example, added via a temporary connection to a permanent utility power source, such as a wall socket. In such instances, charging may be done during off peak hours, such as by plugging in during a janitorial period of the day, so that power may be later consumed during work hours.

The control box and the power unit will be connected to each other and may be connected to other control boxes and power units via wires, wirelessly, and in most cases, by both. These connections may include a network connection, such as to provide for IoT interoperability, data accumulation, and control, by way of non-limiting example. This IoT presence allows for real time reporting of status, station availability, power availability, power needs, and/or grouped units and active units connected within the network. Thereby, office power consumption flexibility is enabled and enhanced.

The foregoing aspects may additionally enhance real time load balancing in the micro, macro and external grids, may provide "clean" AC power, and may protect equipment and productivity, such as during brownouts or blackouts. As used herein, a micro grid management may include power management at one or more grouped work areas, such as to ensure individual station needs are balanced for optimum individual station performance in the context of the connected work areas; macro grid management may include power management at the building level, such as using the office island to best meet the building needs by minimizing peak power consumption, thus allowing building administrators to take advantage of lower power consumption, power rates and facility requirements; and external grid management, which may include management of the grid coming into the facility as supplied by the utility.

For example, peak consumption of power may be appreciably reduced according to certain of the embodiments, as may be the inconvenience of the need for cords to run to desktops, lights, dividers and chairs in need of power. The embodiments may additionally eliminate the need for distinct power supplies and/or AC/DC converters for, for example, laptop computers and certain types of personal lights. As such, architectural and organizational flexibility is provided in arrangements of offices and number and arrangements of work stations, and improved usability and ergonomics for user movement is additionally provided. Thereby, the embodiments also provide improved user comfort and efficiency.

Further, certain of the embodiments may eliminate the need for power conversion to satisfy particular power requirements. For example, computer displays may be provided that do not require conversion from AC power sources. And further, by optionally linking multiple work stations, increased options for generation and drawing of power may be provided.

Figure 1:
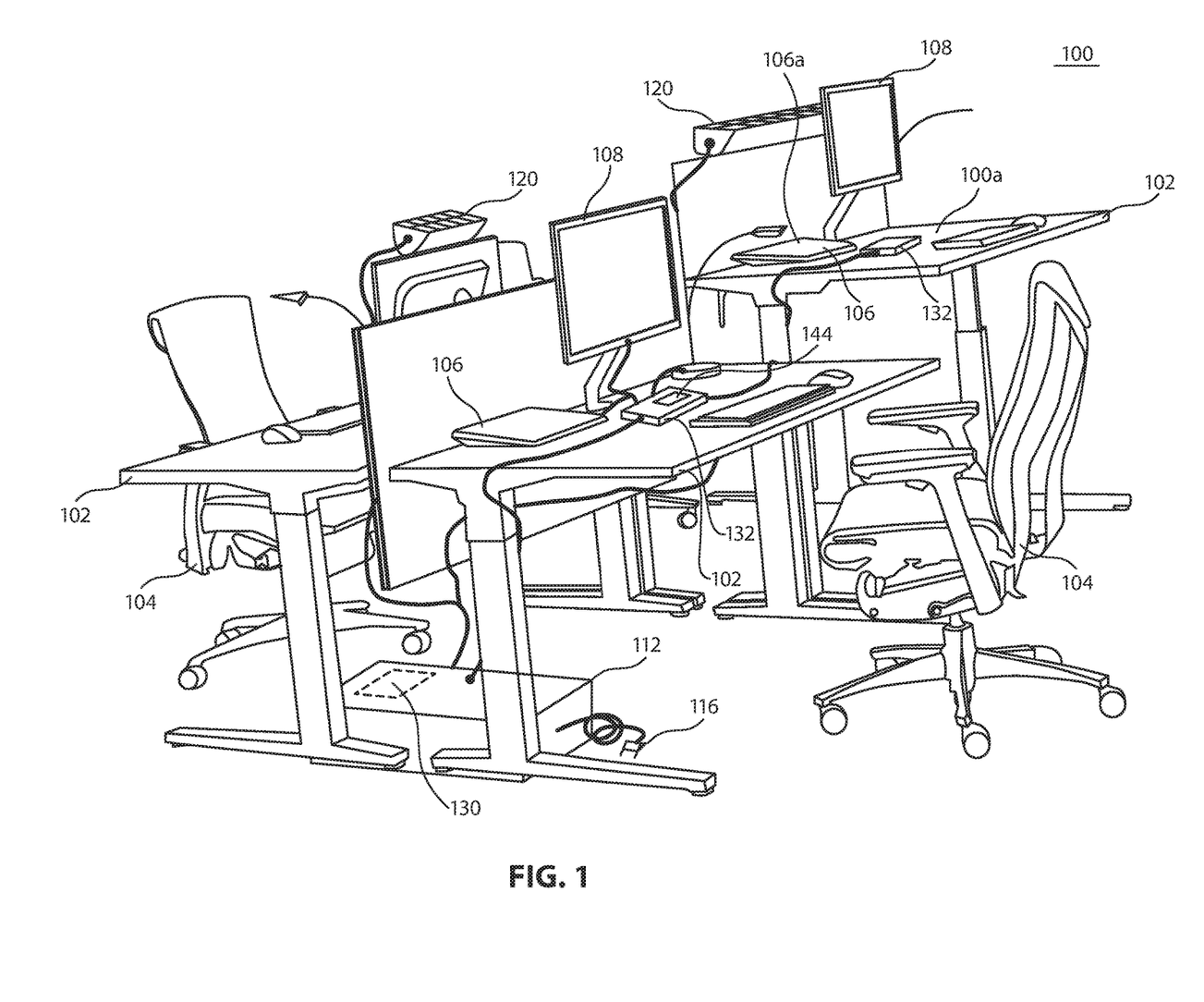
FIG. 1 is a diagram of power provision in an office environment.

FIG. 1 illustrates an embodiment of an office island 100 having exemplary disclosed aspects. In the illustration of island 100, multiple desks 102, chairs 104, and computers 106 may be provided. Among the computers provided may be one or more laptop computers 106a which operate using DC power, unlike desktop computers or lights 110, which, as will be apparent to the skilled artisan, use AC power. Moreover, it may be noted that the displays 108 illustratively associated with laptops or desktops may use AC or DC power, dependent on the type and make of the display.

Further illustrated in FIG. 1 is a dedicated power unit 112. The power unit 112 of FIG. 1 is illustratively shown as serving the entire island shown in FIG. 1, although it will be understood that more than one power unit may serve one or more islands, or portions of an island. Of note, the power unit 112 may have one or more temporary or permanent power inputs 116, such as for recovery of lost power or supplementing supplied power by plugging into a wall socket as and if needed. That is, the power unit 112 may be plugged and unplugged intermittently from available wall or floor power sockets, such as to avoid the permanent presence of one or more cords inconveniently within a walking path around the island 100. The power unit 112 may be rated so as to supply sufficient power for a single workstation in a single day, i.e., approximately 2 kWhr, or may be rated so as to power multiple workstations per day or for part of a day, by way of non-limiting example.

The power unit 112 may additionally have connectively associated therewith, such as via the connective cabling shown, one or more ambient energy collectors 120 that may provide power for storage at the power storage unit 112. Such ambient energy collectors 120 may include, by way of non-limiting example, solar collectors, and may be placed physically in association with the island 100 at points best suited to collect the desired type of energy, such as solar energy, heat energy, light energy, or kinetic energy. By way of non-limiting example, ambient energy collectors may be placed proximate to overhead lighting in order to best receive energy therefrom, or may be placed in association with keyboards or chairs to receive kinetic energy based on user movement.

Additionally associated with power unit 112 may be a network connectivity module 130, such as wi-fi, Bluetooth, near field communication (NFC), or the like. Such a network connectivity module 130 may additionally include wired connectivity. The power unit 112 may also provide the power necessary to operate one or more components of the network connectivity module 130. The network connectivity module 130 may additionally or alternatively be associated with control box units 132, as discussed below.

Illustrated in FIG. 1 are one or more control box units 132. In an exemplary embodiment, a control box unit 132 may be uniquely associated with each work station 100a within the island 100, although it will be appreciated in light of the discussion herein that a single control box unit 132, such as having multiple input and output ports, may alternatively serve multiple or all work stations 100a in a given island 100.

The control box unit 132 may control power drawn from the power unit 112, and may deliver the power dependent upon the power needs of devices electrically connected to the control box unit 132, e.g., devices 106. Thus, for example, DC power or AC power may be provided from power unit 112 as needed by each device 106 connected to the control box unit 132, such as through control box unit 132. Thus, lighting, computer displays, laptops, desktops, specialty lighting, telephones, and other supplemental AC or DC devices 106 may be associated with the control box 132, and may accordingly receive the requisite power uniquely for each device 106 from the control box 132 as supplied to the control box 132 by the power supply unit 112.

In certain of the embodiments of a system according to certain of the embodiments, the control box 132 may have another network connectivity module 144, instead of or in addition to the network connectivity module 130 of the power supply unit 112. Thereby, particular devices at a given work station within an island 100 may uniquely communicate with the network, such as via communications including data related to current usage, typical power needs, wireless computing capabilities, and the like, such as may require wi-fi, Bluetooth, near field communication, or the like.

Each control box 132 may be connectively associated with other control boxes, both across work stations within an island 100, and, in certain of the embodiments, across multiple islands 100. Thereby, use data, power needs, connectivity, and the like may be shared across multiple control box units 132, such as to enhance efficiency of overall power use at a particular island and across islands, and additionally to provide redundancy in the event of single unit failures, either by a particular control box unit or a particular power supply unit, by way of example.

Control box unit interconnectivity may be wired or wireless, such as in the event power is to be shared from control box unit to control box unit serially from a single power supply unit. To the extent control box units are connected in parallel to the power supply unit, interconnection and communication between control box units may occur wirelessly as will be understood in light of the discussion herein.

Figure 2:
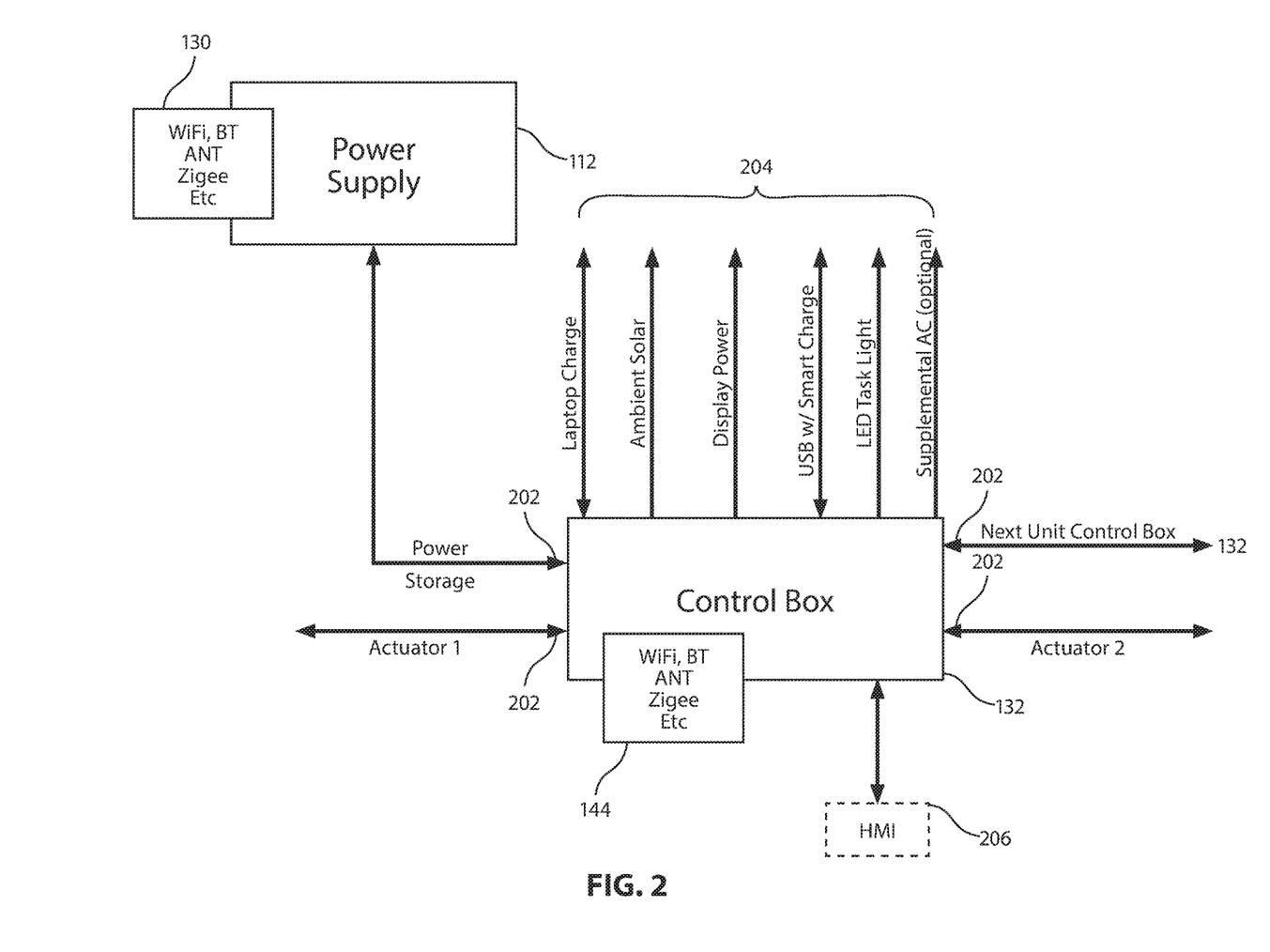
FIG. 2 is a diagram of a control box unit for managing power provision.

FIG. 2 is a block diagram illustrating exemplary interconnection between a single power supply unit 112 and a first control box unit 132 in a series of control boxes. Evident from the illustration of FIG. 2 are the plurality of inputs and outputs 202, 204, that may be provided on each control box unit 132 to enable the interactivity discussed throughout, such as that indicated above in the discussion of FIG. 1.

As illustrated in FIG. 2, each control box unit 132 may additionally have associated therewith a human machine interface (HMI) 206. The HMI 206 may allow for interaction by a user with the control box 132, such as to allow for setting up of particular devices for interoperation with the control box unit 132, setting up interaction of the control box unit 132 with other control box units, setting up the interaction of a control box unit 132 with a power supply unit 112, setting up wireless or wired network connectivity module 144 by the control box unit 132, and the like.

As is further illustrated in FIG. 2, the power unit 112 may include one or more batteries 220. The batteries 220 may, as referenced above, include or accumulate a stored charge to supply power for one or more workstations 100a for a given timeframe (such as one workstation per day, which may be a charge of approximately 2 kWhrs). An exemplary power consumption chart for a single workstation 100a on a daily basis is provided immediately below in Table 1.

As further illustrated, the power unit 112 may include capabilities to deliver power of one or more types 222 (for example AC, DC, sine wave, or square wave) through one or more outputs 226. Moreover, secondary power, such as recharging power for battery 220, may be received at one or more inputs 116, as discussed herein above. Yet further, the power unit 112 may include one or more software modules acting as power control modules 230, such as to manage the accumulation and delivery of power.

Thereby, power may be provided to each work station 100a, such as within an island 100, by a dedicated power supply unit 112 or units. The power supply unit 112 may include the capability to accumulate ambient energy to power work station devices 106, and may include an ability to store power from and or connect to one or more supplemental power supplies, such as wall power or floor power sockets. All of the foregoing may be performed at the instruction of, or at the request for power from, one or more control box units 132 communicatively associated with each power unit 112.

Moreover, each work station 100a within an island 100, or each island 100, may stand alone or be part of a daisy-chained power-providing network, such as in an office or conference center environment. Daisy chaining the network of control box units 132 and/or power units 112 may yield information to allow for advantages, such as balanced and shared power, which can extend the charge life of devices and enhance the efficiency of power consumption. Moreover, certain of the embodiments may provide for green aspects, such as to allow for the sharing of charge accumulation between presently active work stations 100a and work stations 100a to be active at future points in time. Further, the control box unit 132 of the disclosed embodiments may enhance energy consumption efficiency by eliminating the AC to DC power converters, such as have historically been needed to power laptops and direct DC computer monitors/displays.

Yet further, certain of the disclosed aspects may allow for IoT intercommunication as between office devices, work stations, power supplies, and so on, and further may allow for personalization and individualization of office and conference environments through use of IoT. For example, work stations and work islands may be actively reconfigured, in part because power provision and sharing as between wall sockets, ceiling, floor power, and individual work station power no longer need be accounted for in office design. By way of example, power inefficiencies and lapses no longer need to contribute to office design, as if one work station or island reaches a critical state, interconnected power supply units, or other available power supply units possessing adequate charge, may be daisy chained to meet the current power needs of the office island 100.

Additionally, certain devices may consume DC power. Hence, the power unit 112 discussed throughout must account for a maximum DC amperage drawn from that power unit 112. This maximum DC amperage may be an accumulation across multiple work stations or per individual

TABLE 1

| Device | Power Usage (W) | Time (Hrs) | Power (kW hr) | Power (kW hr) |
|---|---|---|---|---|
| Laptop | 60-150 | 8 | 0.48 | 1.20 |
| Monitor | 20-40 | 8 | 0.16 | 0.32 |
| Tablet | 10.5 | 8 | 0.08 | 0.08 |
| Phone | 6 | 8 | 0.05 | 0.05 |
| Task Light | 5-10 | 8 | 0.04 | 0.08 |
| Height Actuators (qty: 2) | 241.6 | 0.03 | 0.01 | 0.01 |
| Totals | 343.1-408.1 | | 0.82 | 1.74 | work station, and may include laptops 106, computer displays 108, task lights 110, phone, mobile device, including tablets, and desk height actuators 114 (actuator is within the vertical desk support). On the other hand, a maximum AC power consumption that must be supplied by each power supply unit 112 may include sufficient AC power to account for at least any interconnected laptops, desktop computers, computing displays, and AC lighting, by way of example.

Accumulation and sufficiency of ambient and/or kinetic power accumulated at each power unit 112 may necessitate various considerations, and may vary based on the grid management capabilities discussed herein. Such considerations may include the number of work stations 100a to be powered, such as within an island, and the amount of AC and DC power needed. The latter consideration may include the display types and sizes for each work station, the wavelength, lumens and type of lighting provided at an island or at each work station, including the distance of overhead lighting from each work station, the charge rate and efficiency of the ambient and/or kinetic energy collectors employed, and the voltage and amperage collectable by the power storage unit and needed for each work station and for each island. The foregoing considerations may be managed by one or more control box units 132, by way of non-limiting example.

Of further note, interconnectivity with IoT (or other network, such as a NFC enabled network) by the control box units 132 and/or the power unit(s) 112 not only allows for power grid management as between work stations 100a and individual islands 100, but further allows for power consumption and device management per work station 100a or by central location. By way of non-limiting example, an app or application may be provided, such as may intercommunicate power needs of devices, workstations 100a, or islands 100 experienced by one or more control box units 132 or power units 112.

Figure 3:
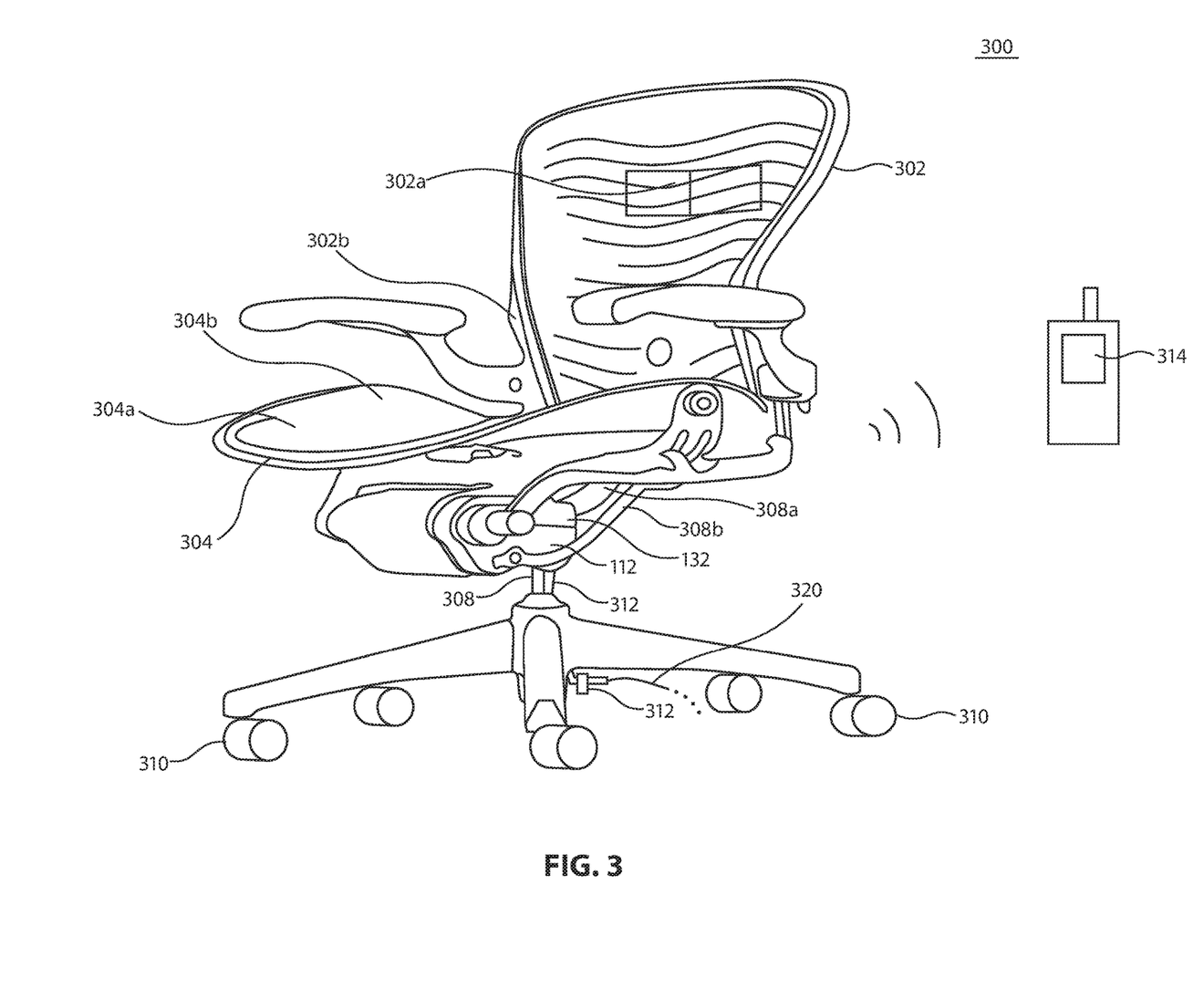
FIG. 3 is a diagram of powered office furniture.

FIG. 3 illustrates a chair 300. The chair 300 may be employed along with or discretely from the herein described embodiments. A chair 300 according to certain of the embodiments may include onboard aspects, such as low voltage enhancements, to improve productivity of the user. Moreover, the chair may include enabling electronics, network productivity, power management capability, and data transmission capability, such as using an onboard control box unit 132 as discussed herein above, or via wire or wireless communication with a control box unit.

More particularly, chair 300 may include a chair back 302, a chair seat 304, a rigid connective structure 308 between the seat 304 or back 302 and the wheels, and a plurality of wheels 310. Moreover, the chair 300 may include one or more electrical conduits 312, such as may rotate or roll and such as may extend downwardly from a hub 310a at which the plurality of wheels 310 are connectively associated. The electrical conduit 312 may carry one or more wires 320, such as to supply power to, and transmit/receive data to or from, aspects of the chair 300.

As referenced above, the chair 300 may include one or more control box units 132, such as may communicate by wire or wirelessly with off-board aspects. For example, the control box unit 132 may control power supplied to aspects of the chair 300. This power may be supplied from onboard the chair 300, such as via battery, from external AC power to the chair 300, or from a power unit 112 as discussed herein above. Further, the control box unit 132 (and/or power unit 112) may include AC to DC conversion capabilities as necessary, and the power unit 112 may be on the chair 300 and may thus include the ability to store and/or charge power onboard the chair 300.

For example, the power unit 112 onboard the chair 300 may include inductive recharging and power maintenance, kinetic recharging and power maintenance, and ambient recharging and power maintenance, by way of non-limiting example, and may receive data related to the foregoing from the control box unit 132. The control box unit 132 may further receive data, such as from aspects of the chair 300, and may send this data to one or more apps 314 or applications to receive feedback from the user of the chair 300, such as for chair adjustments, and/or to provide feedback to the user, such as how to better, more ergonomically, more productively, or otherwise more helpfully use the chair.

As such, the data communicated via the control box unit 132 may include, by way of non-limiting example, storage of preset values, such as locations of aspects of the chair, sensing of locations of aspects of the chair, sensing of movement, heart, respiration, indications of user-comfortable temperature, adequacy of light per user, or the like. The control box unit 132 of the chair 300 may transmit/receive this data, such as to/from one or more networks via Wi-Fi, wire, Bluetooth, NFC or the like. Of note, although these control box unit aspects may be described with respect to the example of FIG. 3 as onboard the chair 300, the skilled artisan will appreciate in light of the present discussion that the chair 300 may be connectively associated, such as via wire or wirelessly, with one or more off-board control units to perform the functions discussed herein throughout.

The back 302 of the chair may include a sensor grid, such as a 3×3 or 2×2 grid of sensors, by way of example, which may sense, for example, user presence, user position, and environmental factors. Moreover, the sensors 302a may assess pressure and/or temperature. Yet further, either based on sensor feedback, user presets, or the like, the seatback 302 may include actuatable features 302b, such as lumbar support pressure actuators, and/or one or more lumbar or seatback warmer or coolers, by way of non-limiting example.

The seat 304 and/or any provided armrest of the chair may additionally include sensor grids, such as 3×3 sensors. These sensors 304a may again sense user position, or environmental conditions, by way of example. Moreover, the seat and/or armrest may include actuatable features 304b, such as variable padding adjustments, warming or cooling, by way of example.

The rigid structure 308 may include electronic height adjustment, electronic seatback adjustment, or the like, and may include capability to automatically set the foregoing per user preferred presets and sensors 308a to sense the foregoing. The rigid structure 308 may additionally include actuatable features 308b, such as an electronic tensioner, by way of non-limiting example.

As discussed above, various sensing and/or automatic adjustments of office furniture may be provided in accordance with certain of disclosed embodiments. Such sensing and/or adjustments may include weight and weight distribution, heart rate, respiration rate, estimated stress level based on biometric feedback, seat height, seatback or seat tension, extent of reclined position, or the like.

Moreover, and in accordance with the foregoing, the office furniture experience may be personalized, as may be the workstation experience as discussed with respect to FIGS. 1 and 2. Personalization of the office furniture experience further contributes to improvement of the increasingly common hotel environments in an office setting. That is, employees frequently rotate and share spaces in today's business environment, and thereby IoT-connected office furniture, such as a chair, will improve usage of space and individual user comforts, such as by employing preset values and user feedback. Such enhancements to user comfort may also include user interaction made from the office furniture, such as may be sensed by the control box unit. Such sensed interactions may include interactions with a mobile device, laptop, or the like, and may include other factors relatedly stored together with the recorded interaction, such as environmental conditions, light levels, ambient temperature, and the like. These other factors may then be adjusted based on each individual user, such as to facilitate typical interactions by that user.

Figure 4:
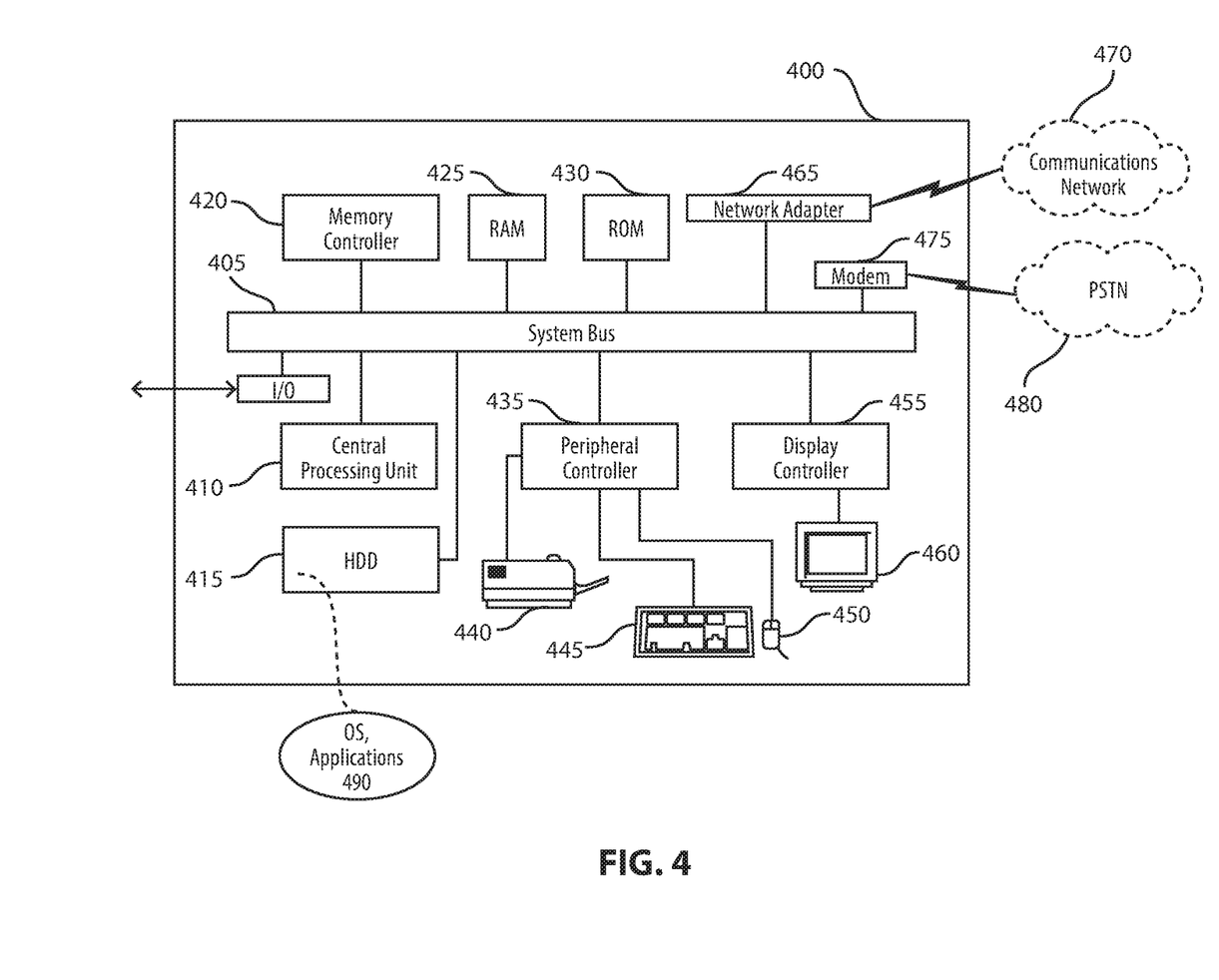
FIG. 4 is a diagram of a computing system.

FIG. 4 depicts an exemplary computing system 400 for use in association with a control box unit 132 and/or a power unit 112, for example. Computing system 400 is capable of executing software, such as an operating system (OS) and one or more computing applications 490. The operation of exemplary computing system 400 is controlled primarily by computer readable instructions, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause computing system 400 to perform operations. In many known computer servers, workstations, personal computers, and the like, CPU 410 is implemented in an integrated circuit called a processor.

It is appreciated that, although exemplary computing system 400 is shown to comprise a single CPU 410, such description is merely illustrative, as computing system 400 may comprise a plurality of CPUs 410. Additionally, computing system 400 may exploit the resources of remote CPUs (not shown), such as other control box units, for example, through communications network 470 or some other data communications means 480.

In operation, CPU 410 fetches, decodes, and executes instructions from a computer readable storage medium such as HDD 415. Such instructions may be included in software such as an operating system (OS), executable programs, and the like, and may include algorithms and applications to perform the functionality described herein.

By way of non-limiting example, CPU 410 may execute, for an island 100 consisting of four control box units 132 and four power units 112, "control box unit 1" may experience high power draw. Accordingly, control box 1 may send a communicative query to "control box 2 unit", "control box unit 3", and control box unit 4" requesting additional power. Accordingly, control box units 2, 3 and 4 may report their respective current states, current draw rates, use condition for the past time period, and expected upcoming power needs based on historic trends, by way of example.

In this example, control box units 2 and 4 may report limited availability and a need to "wait" before sharing power. Control box unit 3 may report available power, and may provide the excess power to a localized grid. Control box units 2 and 4 may allow this power to pass through to maximize the power input passed to control box unit 1.

A query/status cycle such as the foregoing may repeat every "X" minutes, and the system may rebalance. Thereby, multiple control box units and/or power units may be enabled to take or contribute power based on the needs of the grid. If no power is available when needed, an alert message may be generated and temporary power may be added, such as through secondary power input 116. Ultimately, even this secondary/temporary power may be redistributed by the control box units to a system, island or workstation of greatest need. Moreover, if no secondary power is available, other control boxes may execute a contribution of available power until the overall system is normalized.

Returning now particularly to the embodiment of FIG. 4, information, such as computer instructions and other computer readable data, is transferred between components of computing system 400 via the system's main data-transfer path. The main data-transfer path may use a system bus architecture 405, although other computer architectures (not shown) can be used, such as architectures using serializers and deserializers and crossbar switches to communicate data between devices over serial communication paths. System bus 405 may include data lines for sending data, address lines for sending addresses, and control lines for sending interrupts and for operating the system bus. Some busses provide bus arbitration that regulates access to the bus by extension cards, controllers, and CPU 410.

Memory devices coupled to system bus 405 may include random access memory (RAM) 425 and/or read only memory (ROM) 430. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420. Memory controller 420 may provide an address translation function that translates virtual addresses into physical addresses as instructions are executed.

In addition, computing system 400 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus.

Display 460, which is controlled by display controller 455, may be used to display visual output and/or presentation generated by or at the request of computing system 400, responsive to operation of the aforementioned computing program. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, computing system 400 may contain network adapter 465 which may be used to couple computing system 400 to external communication network 470, which may include or provide access to the Internet, an intranet, an extranet, or the like. Communications network 470 may provide user access for computing system 400 with means of communicating and transferring software and information electronically. Additionally, communications network 470 may provide for distributed processing, which involves several computers and the sharing of workloads or cooperative efforts in performing a task. Network adaptor 465 may communicate to and from network 470 using any available wired or wireless technologies. Such technologies may include, by way of non-limiting example, cellular, Wi-Fi, Bluetooth, infrared, or the like.

It is appreciated that exemplary computing system 400 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A delivery system for device power at a plurality of workstations on an island physically disassociated from a power drop in an indoor work environment, comprising:
   at least one power unit associated specifically with the island and being suitable to supply power to the plurality of workstations;
   a plurality of control box units each associated with one of the plurality of workstations, wherein each of the control box unit receives power from the at least one power unit, is communicatively associated with the at least one power unit, and comprises a plurality of power outputs suitable to output power from the at least one power unit to one or more devices associated with the respective workstation; and
   a plurality of ambient and kinetic energy collectors on each of desk chairs, office desks, and computer screens which are suitable to initially collect and accumulate power from the indoor work environment and to later provide the accumulated power to the at least one power unit for eventual output to ones of the plurality of control box units.

2. The system of claim 1, wherein at least one of the one or more devices comprise at least one direct current device.

3. The system of claim 2, wherein the at least one direct current device receives power directly from the control box unit.

4. The system of claim 3, wherein one of the at least one direct current devices comprises a laptop.

5. The system of claim 1, wherein at least one of the one or more devices comprise at least alternating current devices.

6. The system of claim 1, wherein at least one of the one or more devices comprise at least an office chair of the respective workstation.

7. The system of claim 1, wherein one of the ambient energy collectors comprises a light collector.

8. The system of claim 1, wherein one of the ambient energy collectors comprises a thermal energy collector.

9. The system of claim 1, wherein the at least one power unit comprises a temporary connection to supplemental power.

10. The system of claim 1, wherein each of the control box units further comprises a controller suitable to assess power needs of the devices.

11. The system of claim 10, wherein the controller further controls the power outputs to output either DC or AC power dependent upon the power needs of each of the devices connected to each of the power outputs.

12. The system of claim 1, wherein the control box unit further comprises a network connectivity module.

13. The system of claim 12, wherein the network connectivity module comprises a connection to an external mobile device.

14. The system of claim 13, wherein the mobile device connection includes a transmit and receive to and from a data app that provides power consumption data and feedback.

15. The system of claim 12, wherein the network connectivity module comprises connectivity to other secondary control box units.

16. The system of claim 15, wherein the secondary control box units are suitable to deliver excess power from a secondary power unit to the control box unit for distribution to the one or more of the devices.

17. The system of claim 1, wherein the at least one power unit comprises network a connectivity module.

18. The system of claim 17, wherein the network connectivity module provides connectivity to other secondary power units.

19. The system of claim 18, wherein the secondary power units are suitable to deliver excess power from the secondary power unit to the control box unit for distribution to one or more of the devices.

20. The system of claim 1, wherein the communicative association is wireless.

* * * * *